United States Patent [19]

Tassinario

[11] Patent Number: 4,629,948
[45] Date of Patent: Dec. 16, 1986

[54] ELECTRIC MOTOR AND TACHOMETRIC GENERATOR UNIT

[75] Inventor: Giampiero Tassinario, Calenzano/Firenze, Italy

[73] Assignee: Mavilor Systemes S.A., Switzerland

[21] Appl. No.: 719,830

[22] Filed: Apr. 4, 1985

[30] Foreign Application Priority Data

Apr. 11, 1984 [CH] Switzerland ............... 1813/84

[51] Int. Cl.$^4$ ............................................. H02K 23/00
[52] U.S. Cl. ..................................... 318/254; 310/113; 310/68 R; 310/268
[58] Field of Search ............... 310/113, 112, 114, 268, 310/68 R; 318/254 R, 254 A, 138

[56] References Cited

U.S. PATENT DOCUMENTS 4,174,484 11/1979 Schmider .................. 310/268 X
4,237,394 12/1980 Aoki ............................ 310/113
4,366,405 12/1982 Schmider ...................... 310/268
4,385,249 5/1983 Fukushima ................. 310/113 X
4,394,594 7/1983 Schmider et al. ......... 310/268 X
4,517,480 5/1985 Müller ........................ 310/268 X Primary Examiner—Donovan F. Duggan
Attorney, Agent, or Firm—Kane, Dalsimer, Kane, Sullivan and Kurucz

[57] ABSTRACT

In this electric motor and tachometric generator unit the generator comprises a rotor secured to the motor shaft and provided with a set of permanent magnets, and a fixed armature incorporating an armature winding. The commutation of the generator and motor windings is controlled by a coder via an electronic commutation circuit. The generator rotor is disc-shaped and the magnetic axes of the permanent magnets are parallel to the shaft. The movable portion of the coder is the generator rotor cooperating with a set of fixed magnetic sensors, preferably of the Hall type, mounted on one side of the generator rotor, the fixed armature being mounted on the other side of this rotor.

11 Claims, 13 Drawing Figures

ELECTRIC MOTOR AND TACHOMETRIC GENERATOR UNIT

BACKGROUND OF THE INVENTION

The present invention relates to an electric motor associated with a tachometric generator having its rotor rigidly coupled to the motor shaft, this motor being of the commutatorless and permanent-magnet type having an electronic commutation system and comprising a rotor provided with a plurality of permanent magnets, at least one fixed armature incorporating an armature winding of which the commutation is controllable by means of a coder through an electronic commutation circuit, said coder producing signals as a function of the angular position of the rotor and consisting of a coding disc secured to the shaft and cooperating with a set of fixed sensors.

THE PRIOR ART

Electric motors of this general type are already known notably through the European Patent Application 123 347 and the German Patent Application 3 138 323 in which typical motors of this character are described. The coder of these known motors is disposed externally of the motor case and consists for example of a disc rigidly assembled with the rotary shaft and provided on its outer periphery with a plurality of holes corresponding to predetermined commutation angles. The annular portion of the disc in which said holes are formed is movable between opto-electronic emitters and sensors controlling the armature winding commutation circuit each time a hole of said disc registers with a beam generated between an emitter and a sensor.

Other types of coders are also known in the art, such as Hall-effect devices or magneto-resistors cooperating with magnets secured to said disc. In all cases the commutation device or coder is disposed externally of the transducer case, so that a problem arises in connection with the axial dimensions of the motor.

SUMMARY OF THE INVENTION

It is the primary object of the present invention to reduce the overall dimensions and simplifying the construction of a motor of the above-mentioned type. The motor according to the present invention is characterized by the fact that the tachometric generator is of the commutatorless type comprising electronic commutation means, and a disc-shaped rotor carrying a plurality of permanent magnets of which the magnetic axes extend parallel to the motor shaft, this rotor constituting at the same time said motor coding disc cooperating with said sensor system consisting of magnetic sensors, preferably in the form of Hall generators, this system being disposed on one side of the rotor, the fixed armature of the tachometric generator being disposed on the other side of the rotor and provided with an armature winding of which the commutation is controlled by said motor coder via an electronic commutation circuit, that the number of poles and the configuration of the generator winding are compatible with the number of poles and configuration of the motor winding.

Obviously, the advantageous features characterizing this motor and generator unit are a reduced axial dimension and the saving of a movable unit due to the use of a flat rotor and to the fact that the motor coder is at the same time the generator coder, provided that the number of poles and the configurations of the motor and generator windings are compatible. The rotor is disc-shaped and the permanent magnets are secured to this rotor with their axes parallel to the shaft.

In a modified form of embodiment of the invention the rotor of the generator consists of an annular magnet of which one side face is the North pole and the other side face is the South pole, and of two iron discs having a diameter greater than the diameter of said magnet, said discs being secured to the two poles, respectively. The peripheral edges of the two discs extending beyond the outer periphery of the magnet are notched at spaced angular intervals, the number and dimensions of the notches being the same in both discs, said notches being so disposed that each notch of one disc registers with the solid portion left between two adjacent notches of the other disc, whereby the rotor periphery comprises a sequence of alternating magnetic poles. This construction is advantageous in that it is both simple and economical.

The invention will now be described more in detail with reference to the attached drawings illustrating diagrammatically several forms of embodiment thereof given by way of example, not of limitation.

THE DRAWINGS

FIG. 1 is an axial section showing the motor and tachometric generator unit constructed according to the teachings of the present invention, FIG. 2 is a side elevational view of the magnetic sensors, FIG. 3 is a section taken on a larger scale along the line III—III of FIG. 2, FIG. 4 is a diagrammatic view showing the relative arrangement of the armature windings of a four-phase tachometric generator, FIG. 5 is a winding diagram showing the four star-connected windings of FIG. 4, together with the corresponding commutators, FIG. 6 is a diagram showing a pair of poles of the rotor of a generator and the position of the magnetic sensors, the signals emitted from these sensors during the rotor rotation, the signals controlling the commutation of the generator armature windings and the signals controlling the commutation of the motor armature windings, FIG. 7 illustrates the voltages induced in the generator winding sections of FIG. 5, FIG. 8 illustrates the armature assembly of a two-phase generator, FIG. 9 is a diagrammatic view showing the arrangement of the armature windings of the generator of FIG. 8, FIG. 10 illustrates the voltages induced at the terminals of the winding sections of the generator of FIG. 8, FIG. 11 is a plane view of a rotor consisting of an annular magnet with two discs, FIG. 12 is a section taken along the line XII—XII of FIG. 11, and FIG. 13 is a diagram showing the device for controlling the commutation of the armatures of a motor and a generator unit from the generator coder.

DESCRIPTION OF THE PREFERRED EMBODIMENTS

Figure 1:
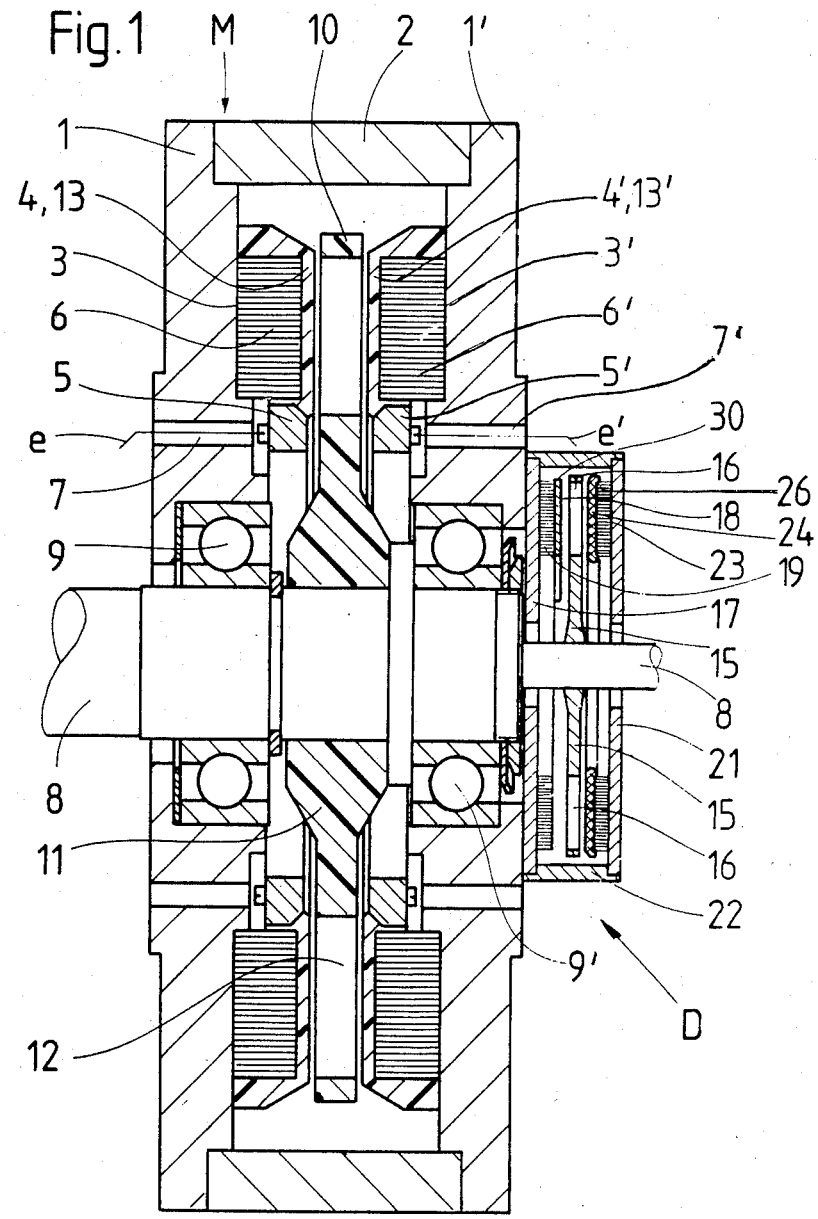
Figure 2:
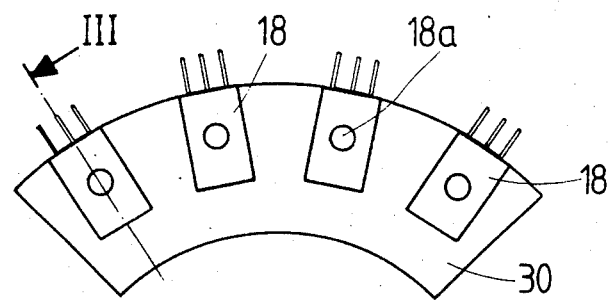
Figure 3:
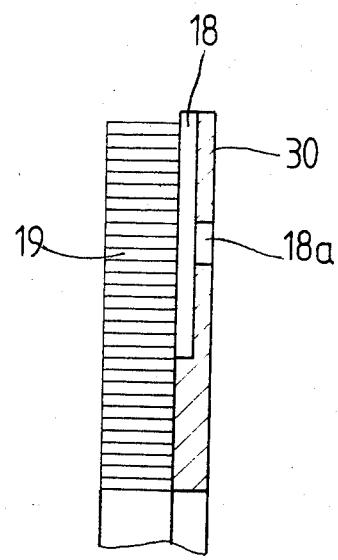

Referring first to FIG. 1 of the drawings, the assembly illustrated therein comprises a motor M and a generator or dynamo D coupled to a common shaft 8. The motor M is similar to the motor described and illustrated in the above-mentioned European Patent Application 123 347, except that its rotor is provided with four pairs of poles and its armature consists of a greater number of windings. In fact, the motor consists of two stator halves disposed symmetrically on either side of a disc-shaped rotor 10 and consisting each, in turn, of a light-alloy flange 1 or 1' and an armature 3 or 3' secured to the inner face of the corresponding flange 1 or 1', respectively. Both flanges 1,1' are interconnected by a ring 2 so as to constitute a motor case. The armature structure comprises an armature winding 4 in the form of a basket weave coil and an annular armature iron 6, both embedded in a peripheral body 13 of plastic material. Furthermore, a connector ring 5 inserted coaxially in the inner cavity of these two elements is partially embedded in an annular mass of plastic material (not shown) having its outer rim embedded in said peripheral body 13 of plastic material. This armature 3 is a particularly compact unit. The armature iron 6 consists preferably of a continuous tape of magnetic iron coiled to constitute an assembly of annular laminations, and the armature winding 4 is disposed on the side facing the rotor 10. The other armature 3' consists similarly of elements 4', 5', 6' and plastic bodies 13' and this of the connector ring 5'.

The connector ring 5 or 5' is divided into a plurality of segments insulated from one another and having their ends connected to the coils constituting the armature windings 4 or 4'. Electrical conductors e, e' lead from the segments of said connector rings 5,5' to the external electronic commutation circuits through passages 7,7' parallel to the motor axis and formed in flanges 1 and 1'. Said circuits are controlled by the rotary coder of generator D, as will be described presently with reference to FIGS. 6 and 13.

The construction and connections of the coils constituting the armature windings 3,3' are described in the above-mentioned European Patent Application 123 347 except that for reasons of compatibility the rotor of the motor shown in FIG. 1 is provided with four pairs of magnetic poles on each face and that the armature winding consists of thirty-two coils, of which four coils are connected in series by the electronic commutation circuit at a predetermined time during one of the eight electronic commutations per electrical cycle. Each armature winding 3,3' consists of an imbricated winding of the type used in conventional dc motors.

The rotor 10 in the form of a flat disc is secured to the motor shaft 8 for example by shrinking or pressing. It comprises a body 11 of synthetic resin having a thicker central hub-forming portion. In the outer peripheral portion of this body 11 and in the example illustrated eight permanent magnets 12 in the form of annular segments are embedded for example in a carbon fibre support in which adequate recesses are formed, the complete assembly being embedded in the mass of synthetic material causing the rotor to adhere strongly to the hub secured in the motor shaft 8. Otherwise, the construction of the rotor 10 is similar to that of the rotor 15 of the generator described hereinbelow.

The generator D comprises a disc-shaped rotor 15 rigidly secured to the shaft 8 of motor M of which it is desired to measure the rotational speed. On one side of this rotor an armature 23 is fastened to the inner face of a stator flange 21 and on the other side an assembly of fixed magnetic sensors 18 to be described in detail presently are disposed.

The armature 23 consists of an armature winding 24 of the flat basket weave coil type and of an annular armature iron 26, both embedded in a mass of suitable plastic material. This armature 23 constitutes a compact unit. The armature iron 26 consists in fact of a coiled tape of magnetic iron forming an annular group of laminations, and the armature winding 24 is disposed on one side of, and registers with, the rotor 15.

Electric conductors (not shown) lead from the ends of the coils constituting the armature winding 24 to external electronic commutator circuits controlled by a rotary coder of which the movable section consists of the rotor 15 proper which cooperates with the magnetic sensors 18. This rotor 15 in the form of a flat disc is for example shrunk or press fitted on the motor shaft 8 and consists of a body of synthetic resin formed with an internal, hub-forming thicker portion. In this body, as shown in FIG. 1, eight permanent magnets 16 in the form of annular segments are embedded, for example in a carbon fibre support formed with corresponding recesses, this assembly being embedded in the mass of synthetic resin and therefore rigidly secured to the motor shaft. The magnetic axes of the permanent magnets 16 are parallel to the shaft 8 and therefore the magnets 16 generate magnetic fields parallel thereto. The thickness of said permanent magnets 16, of which the pole faces are free on both sides, corresponds substantially to that of the body of synthetic material surrounding said magnets. Furthermore, these permanent magnets 16 are disposed at spaced angular intervals on the outer periphery of rotor 15 and so arranged that on each rotor face the pole faces forming a circular row have alternate polarities. Thus, on each rotor face four pairs of poles are disposed at spaced intervals.

The magnetic sensors 18 consisting in this example of Hall generators are secured by the application of pressure in holes 18a formed in an insulating plate 30 cemented to the flat face of an annular iron 19 coaxial to the rotor shaft 15 and secured to a stator flange 17. Preferably, this annular iron 19 consists of a coiled tape of magnetic iron forming an annular group of laminations like the armature iron 26 for closing the magnetic fields. The flanges 17 and 21 are interconnected by a ring 22 to form a case.

Figure 4:
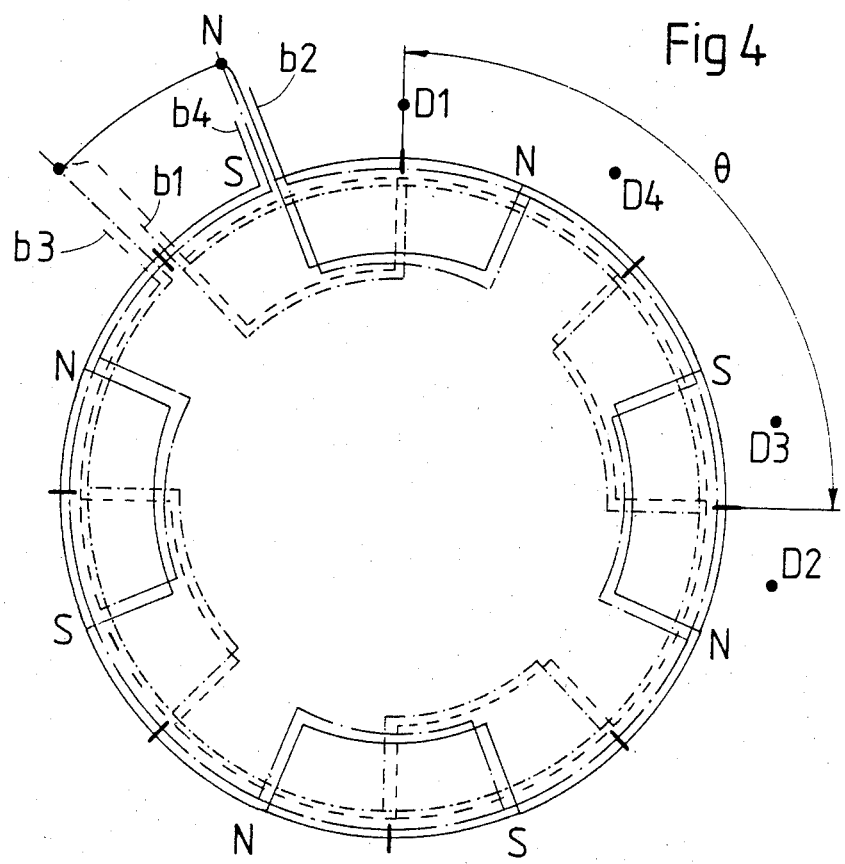
Figure 5:
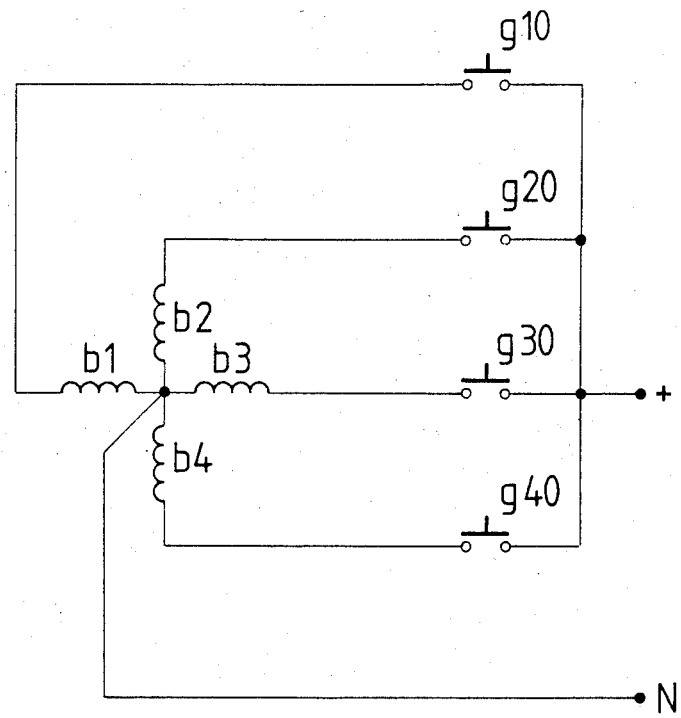

In a first form of embodiment, the generator winding 24 consists in fact of four star-connected windings b1, b2, b3 and b4, as shown in FIG. 5, the relative positions of the four windings consisting each of four series-connected separate coils being shown diagrammatically in FIG. 4. The angle $\theta$ in this specific case spans 90 degrees and corresponds to an electrical cycle, that is to a 360-degree electrical angle, since the rotor is provided with four pairs of magnetic poles.

Windings b1 and b3, on the one hand, and b2 and b4, on the other hand, are superposed but coiled in opposite directions, whereby the voltages induced in the superposed windings have opposite signs corresponding to the phase shift of a 180-degree electrical angle. Both sets of superposed windings are shifted by one-fourth of an electrical cycle (90°), corresponding to a geometrical angle of 22.5° since in this case an electrtical cycle corresponds to 90°, a pair of magnetic poles covering physically a 90-degree geometrical angle. The voltages induced in windings b1 to b4 and notably the positive threshold are fed to the generator output corresponding to points + and N of FIG. 5, by means of successive commutations of commutators g10, g20, g30 and g40.

Figure 6:
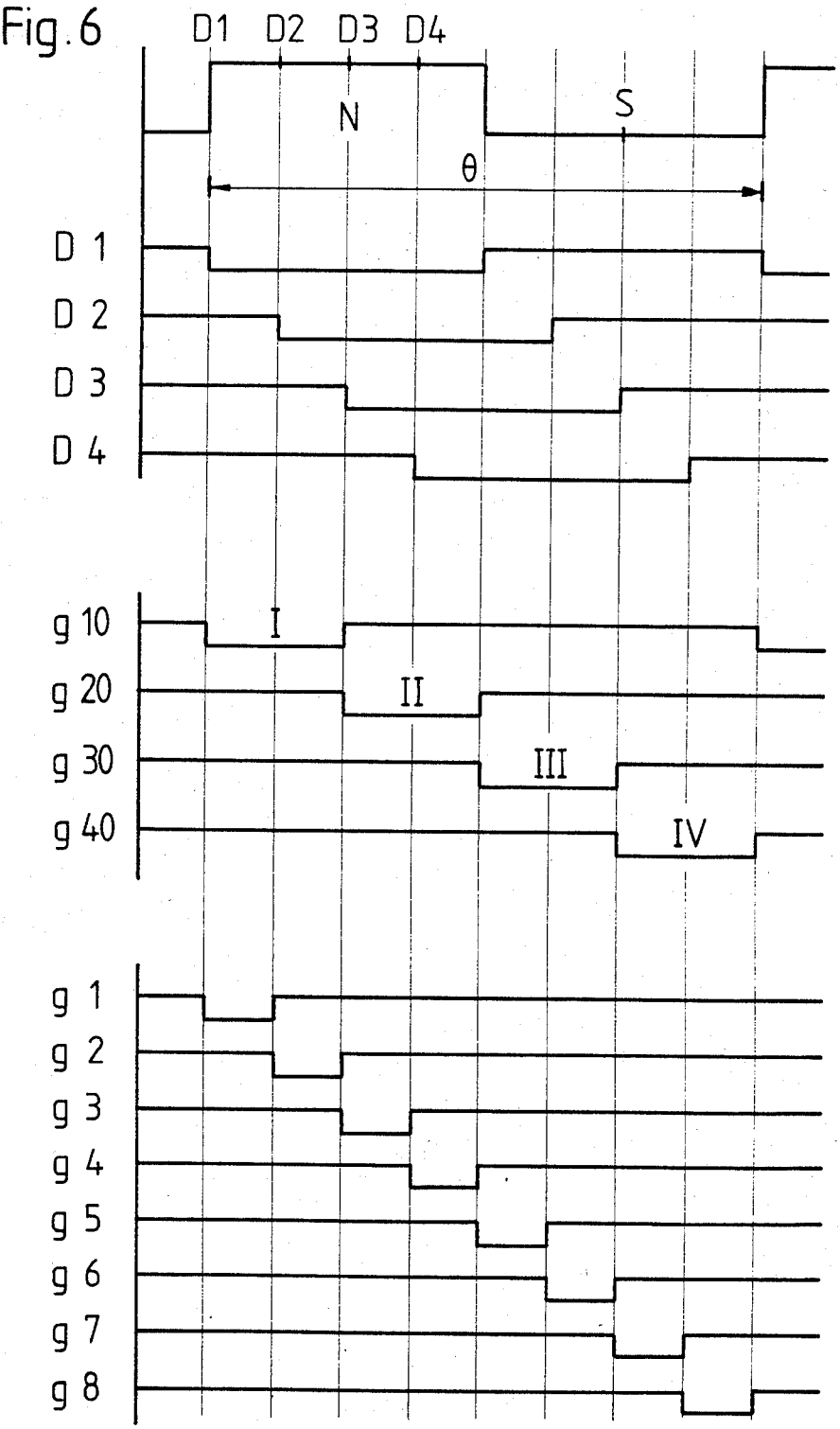

To illustrate diagrammatically the commutation independently of the form of embodiment of FIG. 1, a pair of poles is shown in FIG. 6 with the positions of four magnetic sensors D1, D2, D3 and D4 which, in the present instance, are Hall-effect sensors. These four sensors are secured in front of the rotor to the stator side of the generator, as shown in FIG. 1. The angular spacing between two successive sensors must be equal to a 45-degree electrical angle, that is, to a geometrical angle of 11.25°.

Figure 7:
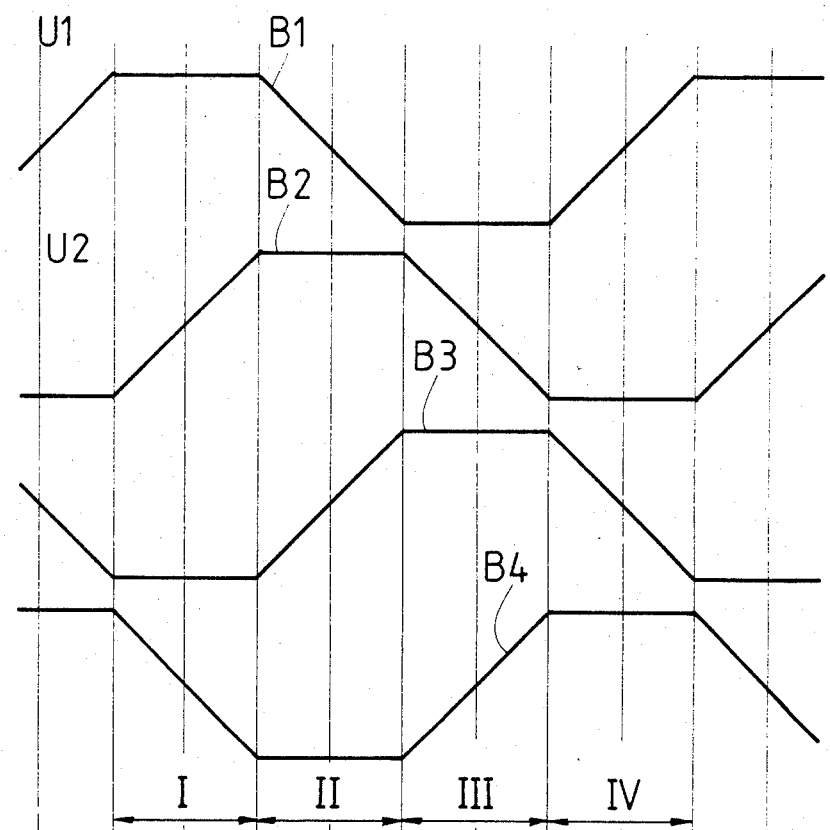

The signals emitted by the Hall sensors D1, D2, D3 and D4 when the North poles of a pair of poles move past two specific poles are shown in FIG. 6 under these poles. The four signals controlling the commutators g10, g20, g30 and g40 are derived only from the signals emitted by sensors D1 and D3, and since four commutations per electrical cycle must be controlled and signals D1 and D3 are phase shifted by one-fourth of an electrical cycle (=90°) and preserve a constant value during a half-cycle (=180°), it is thus possible to generate the four signals g10, g20, g30 and g40 controlling the commutation of the armature windings of the generator during the time periods I, II, III and IV each equal to a 90-degrees electrical angle. The induced voltages B1, B2, B3 and B4 in windings b1, b2, b3 and b4 are illustrated in FIG. 7 together with the four time periods I, II, III and IV corresponding to the time during which the induced voltages B1, B2, B3 and B4 are at their upper threshold. In the present case the generator is coupled to an eight-pole electric motor (similar to the motor described and shown in the above-mentioned European Patent Application 123 347), it is necessary to generate eight commutation signals per electrical cycle and in this case these eight signals g1 to g8 are generated with the assistance of four signals D1, D2, D3 and D4.

Figure 13:
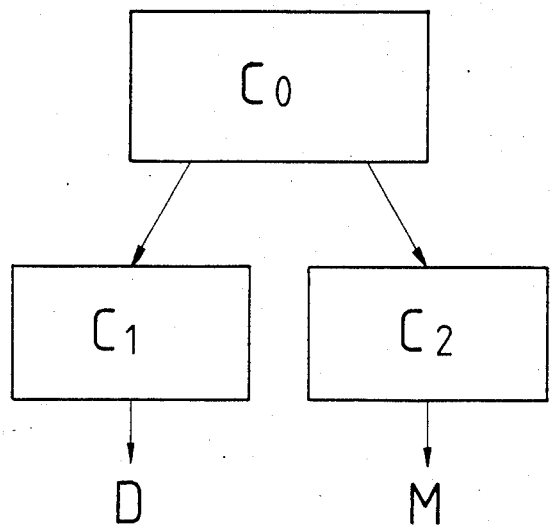

FIG. 13 illustrate diagrammatically the means controlling the commutation of the armature windings of the motor and of the generator from the generator's coder. The signals emitted from this coder Co consisting for example of Hall sensors D1, D2, D3 and D4 are fed to two electronic circuits, namely a first circuit C1 generating the signals g10, g20, g30 and g40 for commutating the armature of generator D, and a second circuit C2 generating signals g1, g2 ... g8 for commutating the armature of motor M, provided of course that the poles of the motor and generator are compatible. A typical example of a motor armature structure using eight commutation signals will be described presently.

Due to the impossibility of disposing the four sensors D1, D2, D3 and D4 on a geometrical arc of 33.75°, these sensors are arranged as illustrated in FIG. 4 showing more particularly their angular positions. The fourth sensor D4 is spaced 33.75° from the first sensor, the second sensor D2 is spaced 101.25° from the first sensor and this corresponds in fact to the shifting of the second pair of poles through an angle of 11.25°. The third sensor D3 is located at 77.5° from the first sensor and excited by the passage of the South pole of the pair of poles and consequently the signal emitted by this sensor is inverted before its utilization. Of course, this four-sensor arrangement constitutes only one among several possible arrangements and is subordinate to the generator dimensions.

Figure 8:
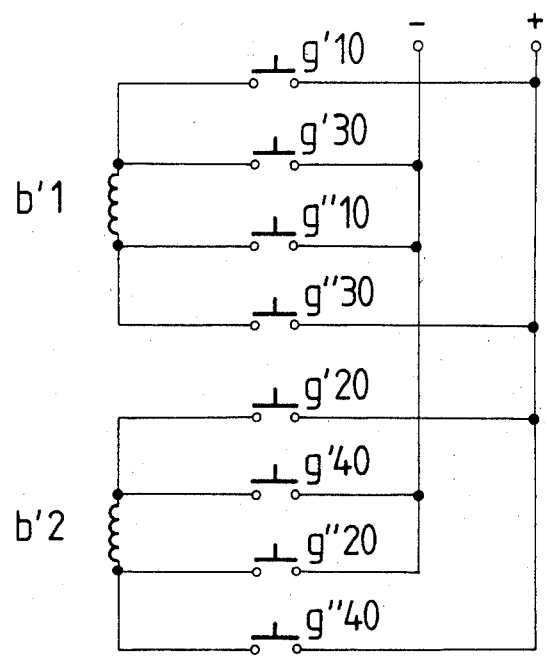

Another modified arrangement of the armature winding consisting of two coils b'1, b'2 is shown in FIG. 8. By controlling the commutation of two terminals of each coils by means of eight commutators g'10, g"10, g'20, g"20, g'30, g"30 and g'40, g"40, four induced voltages can be obtained at the + and − terminals of the generator of which the winding consists of four-star-connected coils. The advantage resulting from the two-coils arrangement of FIG. 8 is that each coil b'1, b'2 comprises more turns than each one of coils b1 to b4, so that the values of the corresponding induced voltages B'1 and B'2 can be increased.

Figure 10:
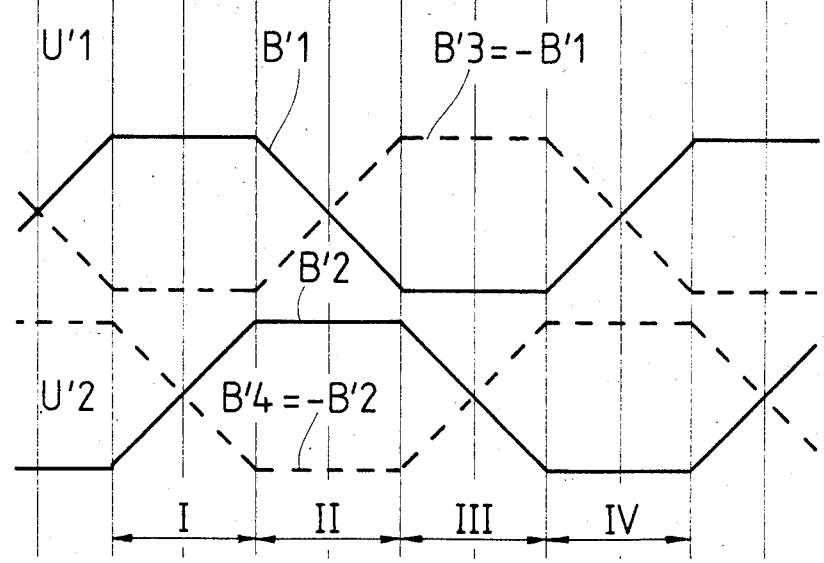
Figure 9:
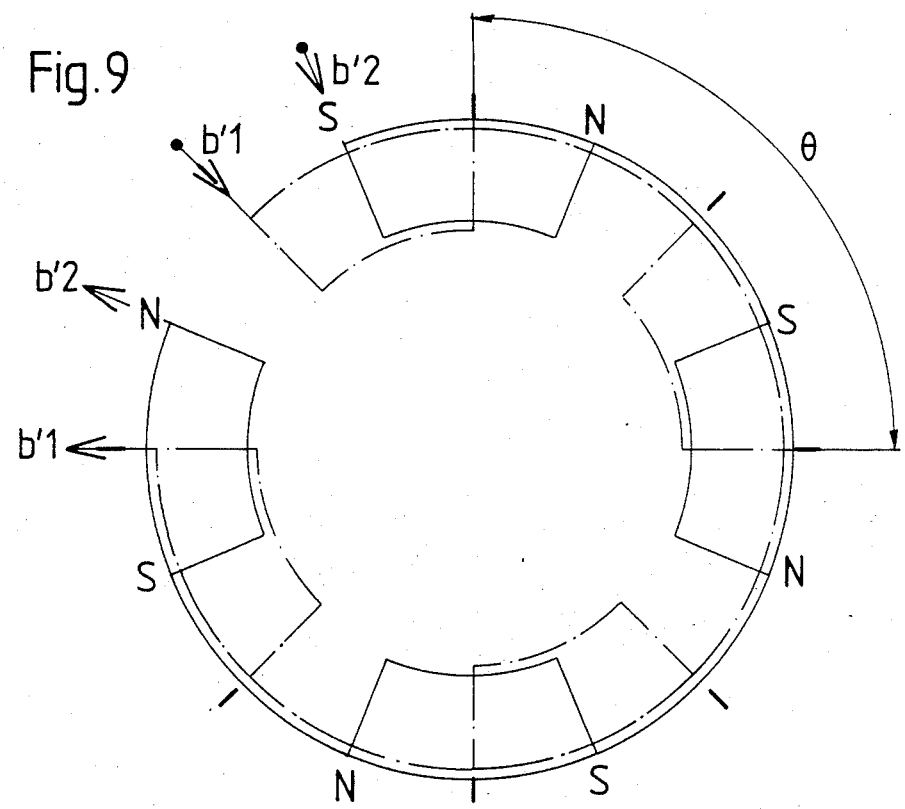

FIG. 9 illustrates the relative arrangement of two windings b'1 and b'2 consisting each of four separate series-connected coils of which the positions correspond to those of coils b1 and b2 of the preceding example. The signals described hereinabove with reference to FIG. 6 are the same in the case of this modified armature with the only difference that the signal g10 controls the commutation of commutators g'10, g"10, g20 controlling the commutation of commutators g'20, g"20 and so forth. In connection therewith, FIG. 10 illustrates the two induced voltages B'1 and B'2 and the opposite voltages B'3 and B'4 obtained across the + and − terminals of the armature of FIG. 6 when commutators g'30, g"30 and g'40, g"40 are closed by means of control signals g30 and g40.

Figure 11:
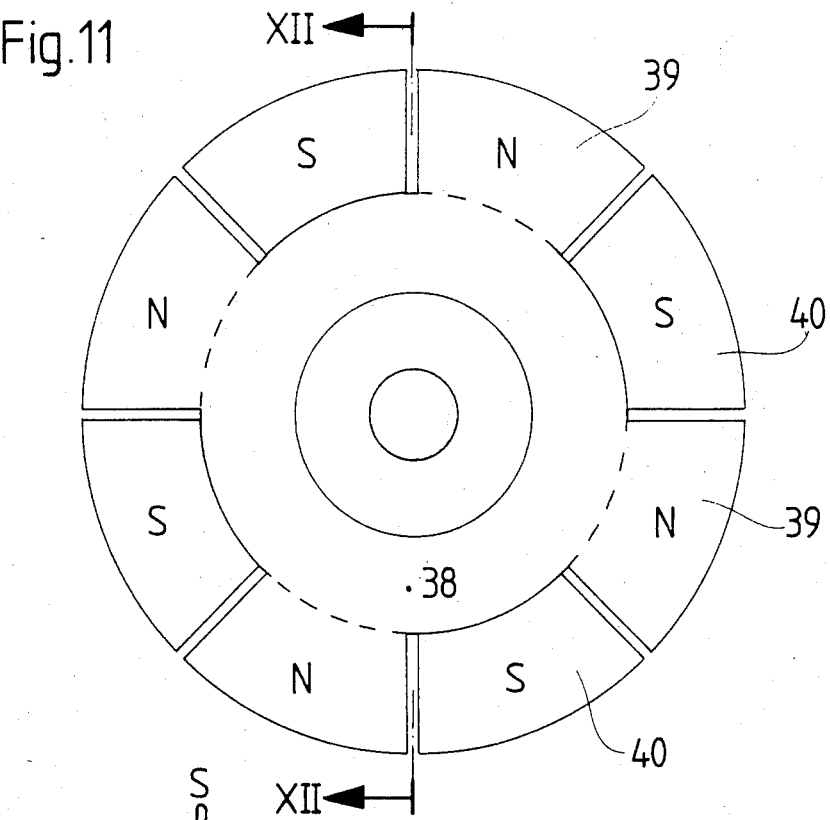
Figure 12:
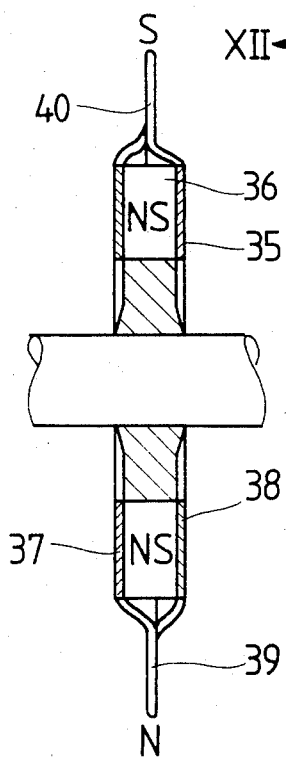

FIGS. 11 and 12 illustrate a modified form of embodiment of rotor 35 which consists of an annular magnet 36 having one side face constituting the North pole while the other side face is the South pole. Secured to the North pole side face is a metal disc 37 of greater diameter than the other annular magnet 36. The peripheral edge of this disc 37, which protrudes radially from the peripheral edge of the magnet, is cut to provide equal, spaced notches 39. Secured to the South pole face of annular magnet 36 is another metal disc 38 of same size and configuration as the first metal disc 37, this other metal disc 38 being also provided on its outer peripheral edge with equal, spaced notches 40 equal in number and size to those of the first disc 37. Both discs 37, 38 are so fastened to the opposed faces of annular magnet 36 that each notch of the first disc 37 registers with the gap formed between two adjacent notches 40 of the second disc 38 without contacting this second disc, the notched portion of each disc being slightly bent twice in opposite directions so as to extend in the same plane of symmetry as the annular magnet 36. Thus, a rotor comprising a sequence of peripheral notches 39, 40 of alternating polarities is obtained.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed is:

1. An electric motor and generator comprising:
   a motor shaft;
   a motor rotor secured to said shaft and having a plurality of first permanent magnets;
   a fixed motor armature with an armature winding, said winding cooperating with said motor rotor to turn said shaft when an armature current is applied to said winding;
   a generator rotor axially spaced from said motor rotor and secured to said motor shaft and including a disc with a plurality of second permanent magnets having magnetic axes parallel to said motor shaft;

a fixed generator armature with a generator winding cooperating said second permanent magnets to generate tachometric signals, said generator winding having a number of poles and a configuration corresponding to the number of poles and configuration of the rotor armature winding;

fixed magnetic sensor means for detecting positions of said second permanent magnets and for generating sensor signals corresponding to said positions; and control means for commutating the armature current to the motor armature and for controlling the tachometric signals from said generator winding; said motor and generator windings having no commutators and brushes.

2. The motor and generator unit of claim 1, wherein said magnetic sensors are embedded in a plate of insulating material cemented to the flat face of an annular iron consisting preferably of magnetic laminations in the form of a continuous tape coated with an insulating layer and coiled on itself.

3. The motor and generator unit of claim 1, wherein the armature winding of the generator has the configuration of a flat cake comprising a plurality of coils partially overlapping each other and mounted on the substantially flat face of an armature iron consisting of a ring coaxial to the rotor, said ring consisting of a continuous tape of magnetic metal coated with a layer of insulating material and coiled on itself.

4. The motor prior and generator of claim 1, wherein said motor rotor comprises an annular magnet of which one side face is the North pole and the other side face is the South pole, an iron disc having a greater diameter than said annular magnet being cemented to said North face with its peripheral edge protruding radially beyond the edge of said annular magnet and formed with equal spaced notches, a second iron disc of same size and shape as said first disc and cemented to the South face of said annular magnet and also provided on its peripheral edge with notches equal in number and size to the notches of said first disc, said second iron disc being shifted angularly in relation to said first iron disc whereby each one of the notches of said second disc is positioned between a pair of adjacent notches of said first disc, said rotor periphery thus comprising a sequence of pole faces of alternate polarities.

5. The motor and generator unit of claim 1, wherein said generator winding comprises two or four phases of which the commutation on one electrical cycle is controlled by four control signals derived from two signals emitted by four magnetic sensors actuated on a 180-degree electrical angle, the commutation of the motor armature winding circuit on one electrical cycle being controlled by eight control signals derived from the four signals emitted from said four magnetic sensors, the rotors of said motor and generator being provided with preferably four pairs of poles per face.

6. The motor and generator unit of claim 1, wherein said magnetic sensors are so disposed within a geometrical angle of 101.25° that they are actuatable sequentially through a 180-degree electrical angle.

7. The motor of claim 1 wherein said magnetic sensors are Hall-effect sensors.

8. The motor of claim 1 wherein said generator winding is disposed on one side of said disc and said sensors are disposed on another side of said disc.

9. The motor and generator of claim 1 further comprising a casing for separating said motor rotor and motor armature from said generator rotor and generator armature.

10. The motor and generator of claim 9 wherein said casing envelopes said motor rotor and motor armature and is made of soft iron.

11. The motor and generator of claim 1 further comprising another fixed motor armature, said fixed motor armatures being disposed on opposite side of said motor rotor.

* * * * *